US010750089B2

(12) United States Patent
Liu et al.

(10) Patent No.: US 10,750,089 B2
(45) Date of Patent: Aug. 18, 2020

(54) METHOD AND APPARATUS FOR CONTROLLING PHOTOGRAPHING OF CAMERA

(71) Applicant: ZTE CORPORATION, Guangdong (CN)

(72) Inventors: Fengpeng Liu, Guangdong (CN); Dongmei Liu, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/072,799

(22) PCT Filed: Mar. 18, 2016

(86) PCT No.: PCT/CN2016/076733
§ 371 (c)(1),
(2) Date: Jul. 25, 2018

(87) PCT Pub. No.: WO2016/197649
PCT Pub. Date: Dec. 15, 2016

(65) Prior Publication Data

US 2019/0028627 A1 Jan. 24, 2019

(30) Foreign Application Priority Data

Jan. 25, 2016 (CN) .......................... 2016 1 0047845

(51) Int. Cl.
*H04N 5/232* (2006.01)

(52) U.S. Cl.
CPC ......... *H04N 5/23258* (2013.01); *H04N 5/232* (2013.01); *H04N 5/2327* (2013.01); *H04N 5/23293* (2013.01)

(58) Field of Classification Search
CPC ............ H04N 5/23248–2329; H04N 5/23293; H04N 5/232933
See application file for complete search history.

(56) References Cited

U.S. PATENT DOCUMENTS

2008/0316339 A1* 12/2008 Sugino ............... H04N 5/23248 348/231.99
2013/0070112 A1* 3/2013 Yoshizawa ......... H04N 5/23248 348/208.2

(Continued)

FOREIGN PATENT DOCUMENTS

CN 101383903 A 3/2009
CN 204340411 U 5/2015

(Continued)

OTHER PUBLICATIONS

International Search Report dated Oct. 26, 2016 for International Application No. PCT/CN2016/076733, 6 pages.

(Continued)

*Primary Examiner* — Paul M Berardesca
(74) *Attorney, Agent, or Firm* — Knobbe, Martens, Olson & Bear, LLP

(57) ABSTRACT

Provided is a method for controlling photographing of a camera, which is applied to an electronic device whose photographic shutter area is provided with a pressure sensing module. The method includes: detecting a press operation for a photographic shutter; collecting pressure sensing data of the pressure sensing module when the press operation is detected; calculating a deformation pattern of the pressure sensing module during the press operation based on the pressure sensing data; calculating a displacement pattern of the camera during the press operation based on the deformation pattern; and determining, according to the displacement pattern, a viewfinding moment at which the camera is capable of capturing an optimal image during the press operation, and outputting an image captured by the camera at the viewfinding moment.

20 Claims, 9 Drawing Sheets

Start

1 Detect a press operation for a photographic shutter

2 Collect pressure sensing data of the pressure sensing module when the press operation is detected 3 Calculate a deformation pattern of the pressure sensing module during the press operation based on the pressure sensing data 4 Calculate a displacement pattern of the camera during the press operation based on the deformation pattern 5 Determine a viewfinding moment at which the camera is capable of capturing an optimal image during the press operation according to the displacement pattern, and output an image captured by the camera at the viewfinding moment End

(56) References Cited

U.S. PATENT DOCUMENTS

| | | | | |
|---|---|---|---|---|
| 2013/0176458 | A1 | 7/2013 | Van Dalen et al. | |
| 2014/0359438 | A1 * | 12/2014 | Matsuki | G02B 7/36 715/702 |

FOREIGN PATENT DOCUMENTS

| | | | | |
|---|---|---|---|---|
| CN | 105100609 | A | | 11/2015 |
| CN | 105159594 | A | | 12/2015 |
| JP | H05-142616 | | * | 6/1993 |
| JP | 2008-271529 | A | | 11/2008 |

OTHER PUBLICATIONS

Written Opinion of the International Searching Authority dated Oct. 26, 2016 for International Application No. PCT/CN2016/076733, 3 pages.

Office Action of corresponding Korean Patent Application No. 10-2018-7024578, and its English Translation—10 pages (dated Nov. 11, 2019).

* cited by examiner

METHOD AND APPARATUS FOR CONTROLLING PHOTOGRAPHING OF CAMERA

CROSS REFERENCE TO RELATED APPLICATIONS

This is the National Stage Application under 35 U.S.C. 371 of International Patent Application No. PCT/CN2016/076733, filed on Mar. 18, 2016, designating the U.S. and published as WO 2016/197649 A1 on Dec. 15, 2016, which claims priority to Chinese patent application No. 201610047845.5 filed on Jan. 25, 2016, the entire disclosure of each of which is hereby incorporated by reference.

TECHNICAL FIELD

The present application relates to, but is not limited to, the field of photographing of a camera of an electronic device and, in particular, relates to a method and apparatus for controlling photographing of a camera.

BACKGROUND

The existence of pressure in electronic devices has always been a problem that needs to be overcome. The pressure has a great impact on cameras. In response to this problem, in the related art, a solution to mechanics applied to the cameras is either to use a pure software algorithm or to correct motion jitter by use of a multi-axis sensor. However, pressure causes a camera to undergo a transient displacement and further causes the camera to produce unsharp photographs in the related art.

SUMMARY

The following is a summary of a subject matter described herein in detail. This summary is not intended to limit the protection scope of the claims.

Embodiments of the present disclosure provide a method and apparatus for controlling photographing of a camera. The method and apparatus are capable of improve the sharpness of photographs produced by the camera under pressure.

Embodiments of the present disclosure provide a method for controlling photographing of a camera, applied to an electronic device, a pressure sensing module is arranged in a photographic shutter area, the method includes:

detecting a press operation for a photographic shutter;

collecting pressure sensing data of the pressure sensing module when the press operation is detected;

calculating a deformation pattern of the pressure sensing module during the press operation based on the pressure sensing data;

calculating a displacement pattern of the camera during the press operation based on the deformation pattern; and determining, according to the displacement pattern, a viewfinding moment at which the camera is capable of capturing an optimal image during the press operation, and outputting an image captured by the camera at the viewfinding moment.

In one or more embodiments, the step of collecting the pressure sensing data of the pressure sensing module includes:

acquiring the pressure sensing data transmitted by the pressure sensing module; and determining a pressure value p(x,y) at each location point on the pressure sensing module by taking a position on the pressure sensing module and corresponding to the photographic shutter as an origin of coordinates, where (x,y) denotes distance and position information of the each location point on the pressure sensing module relative to the origin of coordinates.

In one or more embodiments, the step of calculating the deformation pattern of the pressure sensing module during the press operation based on the pressure sensing data includes:

determining a deformation value d1(x,y) at the each location point on the pressure sensing module using a preset formula 1 based on the pressure value p(x,y) at the each location point on the pressure sensing module, and determining the deformation pattern of the pressure sensing module during the press operation, where the preset formula 1 is:

$$d1(x,y)=p(x,y)\times\lambda(x,y),$$

where λ(x,y) denotes a deformation coefficient of the each location point on the pressure sensing module.

In one or more embodiments, the step of calculating the displacement pattern of the camera during the press operation based on the deformation pattern includes:

determining a force Fz applied on the camera in a z direction during the press operation, where the z direction is a direction parallel to a direction of the press operation; and determining a displacement value f(z) of the camera in the z direction at each moment during the press operation using a preset formula 2 based on the deformation value d1(x,y) at the each location point on the pressure sensing module, and determining the deformation pattern of the camera in the z direction during the press operation, where the preset formula 2 is:

$$f(z)=d1(x,y)\times\int Fz\times t^2/mdt,$$

where m denotes a quality of the camera and t denotes a duration from a starting time of the press operation to the each moment during the press operation.

In one or more embodiments, the step of determining, according to the displacement pattern, the viewfinding moment at which the camera is capable of capturing an optimal image during the press operation, and outputting the image captured by the camera at the viewfinding moment includes:

determining a plurality of viewfinding moments of the camera during the press operation;

calculating a plurality of displacement values of the camera in the z direction at the plurality of viewfinding moments using the preset formula 2;

comparing between the displacement values of the camera in the z direction at the plurality of viewfinding moments and determining a viewfinding moment corresponding to a minimal displacement value of the camera in the z direction to be an optimal viewfinding moment; and outputting an image captured by the camera at the optimal viewfinding moment as a captured image of the press operation.

In one or more embodiments, the step of comparing between the displacement values of the camera in the z direction at the plurality of viewfinding moments includes:

comparing between the displacement values in the z direction at the plurality of viewfinding moments to determine a minimal displacement value; and determining whether a number of the determined minimal displacement value is one; when the number of the determined minimal displacement value is one, determining the viewfinding moment corresponding to the minimal displacement value of the camera in the z direction to be the optimal viewfinding moment; where when the number of the determined minimal displacement value is at least two, the method further includes:

extracting at least two viewfinding moments corresponding to the minimal displacement value of the camera in the z direction as candidate viewfinding moments;

calculating displacement values of the camera in an xy plane at the at least two candidate viewfinding moments, where the xy plane is a plane perpendicular to the direction of the press operation; and comparing between the displacement values of the camera in the xy plane at the at least two candidate viewfinding moments and determining one candidate viewfinding moment of the at least two candidate viewfinding moments corresponding to a minimal displacement value of the camera in the xy plane to be the optimal viewfinding moment; and outputting an image captured by the camera at the optimal viewfinding moment as a captured image of the press operation.

In one or more embodiments, the step of calculating the displacement values of the camera in the xy plane at the at least two candidate viewfinding moments includes:

determining a force Fx applied on the camera in an x direction during the press operation;

determining displacement values f(x) of the camera in the x direction at the at least two candidate viewfinding moments using a preset formula 3 based on the deformation value d1(x,y) at the each location point on the pressure sensing module, where the preset formula 3 is:

$$f(x)=d1(x,y)\times\int Fx\times t^2/m dt,$$

where m denotes the quality of the camera and t denotes a duration from the starting time of the press operation to each of the at least two candidate viewfinding moments;

determining a force Fy applied on the camera in a y direction during the press operation;

determining displacement values f(y) of the camera in the y direction at the at least two candidate viewfinding moments using a preset formula 4 based on the deformation value d1(x,y) at the each location point on the pressure sensing module, and calculating the deformation pattern of the camera in the y direction during the press operation, where the preset formula 4 is:

$$f(y)=d1(x,y)\times\int Fy\times t^2/m dt,$$

where m denotes the quality of the camera and t denotes the duration from the starting time of the press operation to the each of the at least two candidate viewfinding moments; and calculating the displacement values of the camera in the xy plane at the at least two candidate viewfinding moments based on the displacement values f(x) of the camera in the x direction and the displacement values f(y) of the camera in the y direction at the at least two candidate viewfinding moments.

In one or more embodiments, the step of determining the force Fx applied on the camera in the x direction, the force Fy applied on the camera in the y direction and the force Fz applied on the camera in the z direction during the press operation includes:

determining a coordinate location point A of a projection of the camera in a plane where the pressure sensing module is located;

determining a deformation value d1(m,n) of the pressure sensing module at the coordinate location point A using the preset formula 1; and determining the force Fx applied on the camera in the x direction, the force Fy applied on the camera in the y direction and the force Fz applied on the camera in the z direction based on the deformation value d1(m,n) of the pressure sensing module at the coordinate location point A.

In another aspect of the present application, embodiments of the present disclosure further provide an apparatus for controlling photographing of a camera, applied to an electronic device, where a pressure sensing module is arranged in a photographic shutter area, the apparatus includes:

a detecting module, which is configured to detect a press operation for a photographic shutter;

a pressure data collection module, which is configured to collect pressure sensing data of the pressure sensing module when the press operation is detected;

a deformation pattern calculation module, which is configured to calculate a deformation pattern of the pressure sensing module during the press operation based on the pressure sensing data;

a displacement pattern calculation module, which is configured to calculate a displacement pattern of the camera during the press operation based on the deformation pattern; and an image outputting module, which is configured to determine, according to the displacement pattern, a viewfinding moment at which the camera is capable of capturing an optimal image during the press operation and output an image captured by the camera at the viewfinding moment.

In one or more embodiments, the pressure data collection module includes:

an acquisition unit, which is configured to acquire the pressure sensing data transmitted by the pressure sensing module; and a determining unit, which is configured to determine a pressure value p(x,y) at each location point on the pressure sensing module by taking a position on the pressure sensing module and corresponding to the photographic shutter as an origin of coordinates, where (x,y) denote distance and position information of the each location point on the pressure sensing module relative to the origin of coordinates.

In one or more embodiments, the deformation pattern calculation module is configured to:

determine a deformation value d1(x,y) at the each location point on the pressure sensing module using a preset formula 1 based on the pressure value p(x,y) at the each location point on the pressure sensing module, and determine the deformation pattern of the pressure sensing module during the press operation, where the preset formula 1 is:

$$d1(x,y)=p(x,y)\times\lambda(x,y),$$

where λ(x,y) denotes a deformation coefficient of the each location point on the pressure sensing module.

In one or more embodiments, the displacement pattern calculation module includes:

a first calculation unit, which is configured to determine a force Fz applied on the camera in a z direction during the press operation, where the z direction is a direction parallel to a direction of the press operation; and a second calculation unit, which is configured to determine a displacement value f(z) of the camera in the z direction at each moment during the press operation using a preset formula based on the deformation value d1(x,y) at the each location point on the pressure sensing module, and to determine the deformation pattern of the camera in the z direction during the press operation, where the preset formula 2 is:

$$f(z)=d1(x,y)\times\int Fz\times t^2/mdt,$$

where m denotes a quality of the camera and t denotes a duration from a starting time of the press operation to the each moment during the press operation.

In one or more embodiments, the image outputting module includes:

a first viewfinding moment determining unit, which is configured to determine a plurality of viewfinding moments of the camera during the press operation;

a third calculation unit, which is configured to calculate displacement values of the camera in the z direction at the plurality of viewfinding moments using the preset formula 2;

a first comparison unit, which is configured to compare between the displacement values of the camera in the z direction at the plurality of viewfinding moments and determine a viewfinding moment corresponding to a minimal displacement value of the camera in the z direction to be an optimal viewfinding moment; and an outputting unit, which is configured to output an image captured by the camera at the optimal viewfinding moment as a captured image of the press operation.

In one or more embodiments, the first comparison unit includes:

a displacement value determining subunit, which is configured to compare between the displacement values in the z direction at the plurality of viewfinding moments to determine a minimal displacement value; and a determining subunit, which is configured to determine whether a number of the determined minimal displacement value is one; when the number of the determined minimal displacement values is one, determine the viewfinding moment corresponding to the minimal displacement value of the camera in the z direction to be the optimal viewfinding moment; where when the number of the determined minimal displacement value is at least two, the image outputting module further includes:

a second viewfinding moment determining unit, which is configured to extract at least two viewfinding moments corresponding to the minimal displacement value of the camera in the z direction as candidate viewfinding moments;

a fourth calculation unit, which is configured to calculate displacement values of the camera in an xy plane at the at least two candidate viewfinding moments, where the xy plane is a plane perpendicular to the direction of the press operation; and a second comparison unit, which is configured to compare between the displacement values of the camera in the xy plane at the at least two candidate viewfinding moments and determine one candidate viewfinding moment of the at least two candidate viewfinding moments corresponding to a minimal displacement value of the camera in the xy plane to be the optimal viewfinding moment.

In one or more embodiments, the fourth calculation unit is configured to:

determine a force Fx applied on the camera in an x direction during the press operation;

determine displacement values f(x) of the camera in the x direction at the at least two candidate viewfinding moments using a preset formula 3 based on the deformation value d1(x,y) at the each location point on the pressure sensing module, where the preset formula 3 is:

$$f(x)=d1(x,y)\times\int Fx\times t^2/mdt,$$

where m denotes the quality of the camera and t denotes a duration from the starting time of the press operation to each of the at least two candidate viewfinding moments;

determine a force Fy applied on the camera in a y direction during the press operation;

determine displacement values f(y) of the camera in the y direction at the at least two candidate viewfinding moments using a preset formula 4 based on the deformation value d1(x,y) at the each location point on the pressure sensing module, and to calculate the deformation pattern of the camera in the y direction during the press operation, where the preset formula 4 is:

$$f(y)=d1(x,y)\times\int Fy\times t^2/mdt,$$

where m denotes the quality of the camera and t denotes the duration from the starting time of the press operation to the each of the at least two candidate viewfinding moments; and calculate the displacement values of the camera in the xy plane at the at least two candidate viewfinding moments based on the displacement values f(x) of the camera in the x direction and the displacement values f(y) of the camera in the y direction at the at least two candidate viewfinding moments.

Furthermore, embodiments of the present disclosure further provide a computer-readable storage medium configured to store computer-executable instructions for implementing the above-mentioned method for controlling photographing of a camera when the computer-executable instructions are executed.

The method for controlling photographing of a camera provided by embodiments of the present disclosure uses the pressure sensing module to collect the pressure data of the pressure sensing module, calculates the deformation pattern of the pressure sensing module, calculates the displacement information of the camera, and then targetedly makes an active effect compensation to improve the photographing effect of the camera.

The apparatus for controlling photographing of a camera provided by embodiments of the present disclosure uses the above method for controlling photographing of a camera to determine the viewfinding moment corresponding to the minimal displacement value of the camera in the z direction and in the xy plane. That is, the apparatus is capable of determining the photograph of a highest sharpness taken by the camera.

Other aspects can be understood after the accompanying drawings and detailed description are read and understood.

DETAILED DESCRIPTION

A detailed description will be given below with reference to the accompanying drawings and embodiments.

Figure 1:
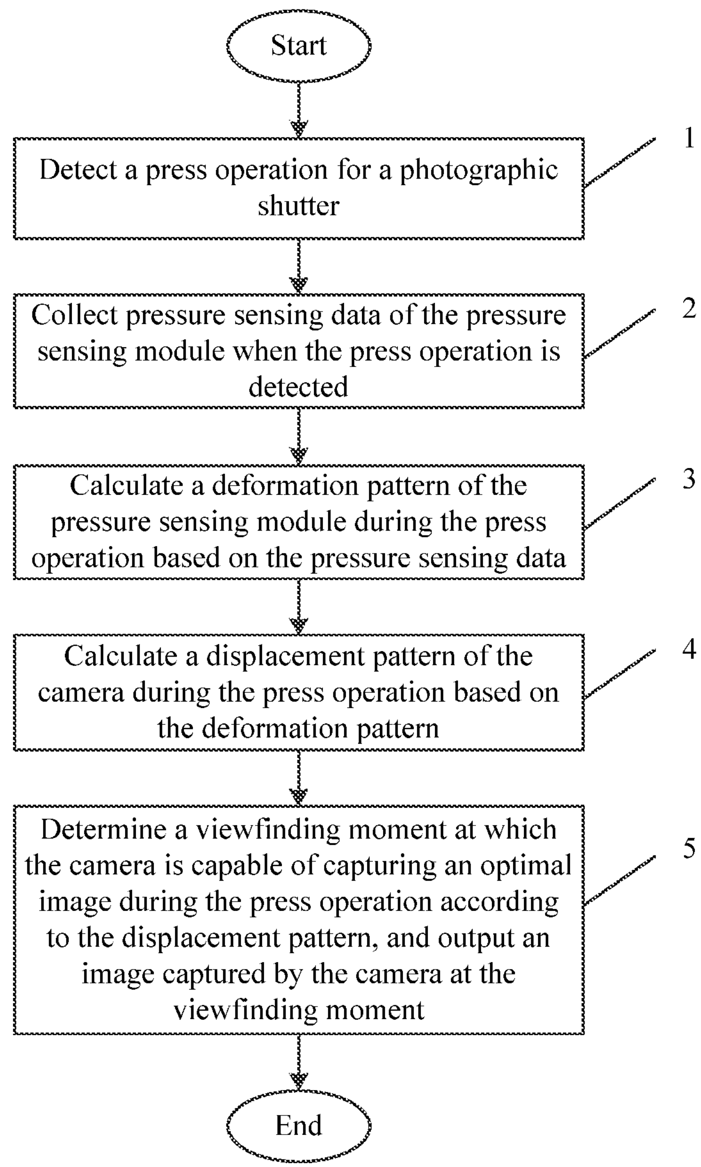
FIG. 1 is a flowchart of a method for controlling photographing of a camera according to an embodiment of the present disclosure.

Referring to FIG. 1, embodiments of the present disclosure provide a method for controlling photographing of a camera. The method is applied to an electronic device. A pressure sensing module is arranged in the photographic shutter area. The method includes the steps described below.

In step 1, a press operation for a photographic shutter is detected.

In step 2, pressure sensing data of the pressure sensing module is collected when the press operation is detected.

In step 3, a deformation pattern of the pressure sensing module during the press operation is calculated based on the pressure sensing data.

In step 4, a displacement pattern of the camera during the press operation is calculated based on the deformation pattern.

In step 5, a viewfinding moment at which the camera is capable of capturing an optimal image during the press operation is determined according to the displacement pattern, and an image captured by the camera at the viewfinding moment is outputted.

The camera under the pressure undergoes a transient displacement that causes a change in sharpness of a photograph taken by the camera. The larger the transient displacement value of the camera, the lower the sharpness of the photograph taken by the camera. The method for controlling photographing of a camera provided by embodiments of the present disclosure calculates the displacement pattern of the camera during the press operation based on the deformation of the pressure sensing module caused by the pressure during the press operation and then selects the image captured at the viewfinding moment corresponding to the minimal displacement value of the camera as the final image captured by the camera, thereby improving the sharpness of photographs produced by the camera under pressure.

The method for controlling photographing of a camera provided by embodiments of the present disclosure is applied to an electronic device whose photographic shutter area is provided with a pressure sensing module. The electronic device includes a control panel for a touch operation by a user and a pressure sensing module attached to the control panel. The pressure sensing module includes a pressure sensing module panel. The camera is disposed at a lower end of the pressure sensing module. When the user presses and operates the control panel, a corresponding pressure is applied on the pressure sensing module panel and the pressure sending module panel undergoes a deformation. This deformation of the pressure sending module panel causes the camera to displace during the press operation.

Figure 12:
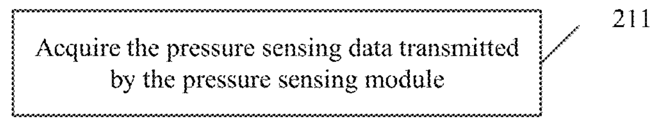
FIG. 12 is a flowchart of a step 2 of the method for controlling photographing of a camera according to an embodiment of the present disclosure.

The step 2 of collecting the pressure sensing data of the pressure sensor includes the step described below, as shown in FIG. 12.

In step 211, the pressure sensing data transmitted by the pressure sensing module is acquired; and a pressure value p(x,y) at each location point on the pressure sensing module is determined by taking a position on the pressure sensing module and corresponding to the photographic shutter as an origin of coordinates, where x,y denote distance and position information of each location point on the pressure sensing module relative to the origin of coordinates.

Figure 13:
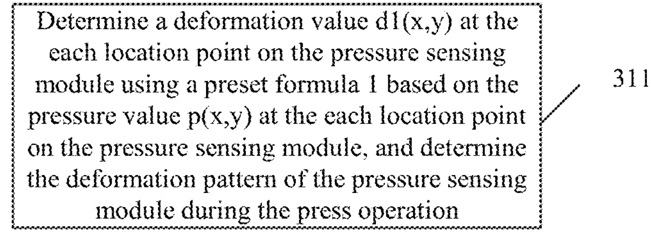
FIG. 13 is a flowchart of a step 3 of the method for controlling photographing of a camera according to an embodiment of the present disclosure.

The step 3 of calculating the deformation pattern of the pressure sensor during the press operation based on the pressure sensing data includes the step described below, as shown in FIG. 13.

In step 311, a deformation value d1(x,y) at the each location point on the pressure sensing module is determined using a preset formula 1 based on the pressure value p(x,y) at the each location point on the pressure sensing module, and the deformation pattern of the pressure sensing module during the press operation is determined, where the preset formula 1 is:

$$d1(x,y)=p(x,y)\times\lambda(x,y),$$

λ(x,y) denotes a deformation coefficient at the each location point on the pressure sensing module. The deformation coefficient is an average value calculated from data obtained through multiple deformation coefficient measurement experiments of the pressure sensing module panel. When used in this embodiment, λ(x,y) is a known value.

λ(x,y) is:

$$\lambda(x,y)=\Delta I/I.$$

ΔI denotes an increment or decrement of the deformation length of the pressure sensing module panel under the pressure. I denotes the total length of the pressure sensing module panel. When a deformation coefficient measurement experiment of the pressure sensing module panel is conducted separately, the total length of the pressure sensing module panel is measured first by use of a tool. When the pressure sensing module panel is subjected to an external force, the pressure sensing module panel is deformed so that the total length of the panel increases or decreases. The total length I of the deformed pressure sensing module panel is measured first by use of the tool, and then ΔI is calculated, where ΔI=I−l. Multiple ratios ΔI/I are calculated through multiple deformation coefficient measurement experiments of the pressure sensing module panel, and then the average value of the multiple ratios ΔI/I is calculated to obtain the value of λ(x,y) in this embodiment.

Figure 14:
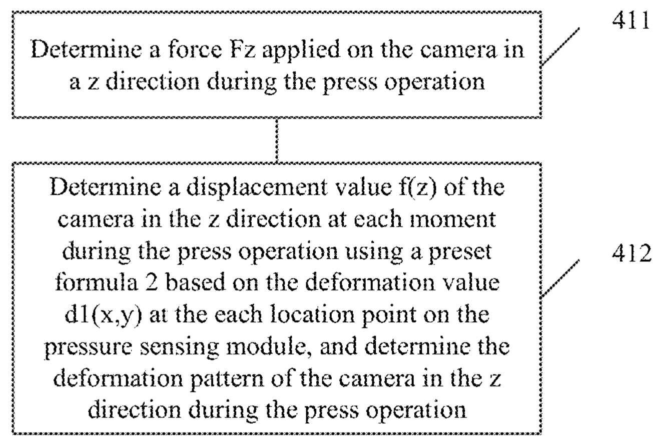
FIG. 14 is a flowchart of a step 4 of the method for controlling photographing of a camera according to an embodiment of the present disclosure.

The step 4 of calculating the displacement pattern of the camera during the press operation based on the deformation pattern includes the steps described below, as shown in FIG. 14.

In step 411, a force Fz applied on the camera in a z direction during the press operation is determined.

In step 412, a displacement value f(z) of the camera in the z direction at each moment during the press operation is determined using a preset formula 2 based on the deformation value d1(x,y) at the each location point on the pressure sensing module, and the deformation pattern of the camera in the z direction during the press operation is determined, where the preset formula 2 is:

$$f(z)=d1(x,y)\times\int Fz\times t^2/mdt,$$

where m denotes a quality of the camera and t denotes a duration from a starting time of the press operation to the each moment during the press operation.

Figure 2:
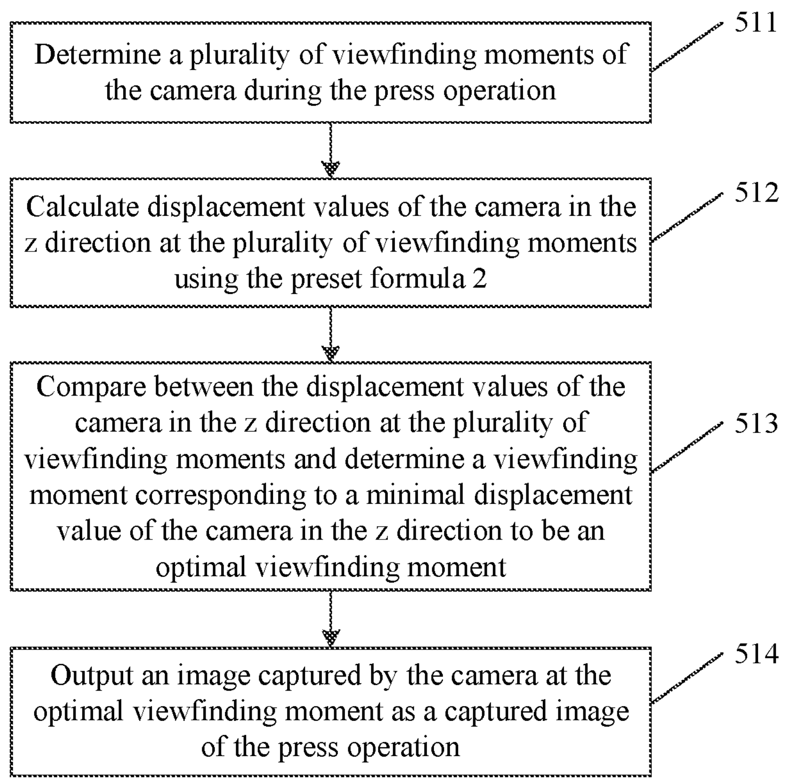
FIG. 2 is a flowchart of determining an optimal viewfinding moment of a camera by a pressure sensing module in a method according to an embodiment 1 of the present disclosure.

In an embodiment 1, referring to FIG. 2, the step 5 in which the viewfinding moment at which the camera is capable of capturing an optimal image during the press operation is determined according to the displacement pattern and the image captured by the camera at the viewfinding moment is outputted includes the steps described below.

In step 511, a plurality of viewfinding moments of the camera during the press operation are determined. In an embodiment, the viewfinding moments during the press operation may be distributed in any proper manners.

In step 512, displacement values of the camera in the z direction at the plurality of viewfinding moments are calculated using the preset formula 2.

In step 513, the displacement values of the camera in the z direction at the plurality of viewfinding moments are compared with each other and a viewfinding moment corresponding to a minimal displacement value of the camera in the z direction is determined to be an optimal viewfinding moment.

In step 514, an image captured by the camera at the optimal viewfinding moment is outputted as a captured image of the press operation.

The following describes an example that illustrates a specific method for selecting the optimal viewfinding moment of the camera in the z direction.

The preset formula 1 may be used to obtain the deformation value d1(0,0) at the origin of coordinates (0,0) on the pressure sensing module based on the pressure p(0,0) at the origin of coordinates (0,0). The deformation values at multiple location points on the pressure sensing module may be obtained based on the pressure values at the multiple location points. The multiple deformation values are combined to form the deformation pattern of the pressure sensing module.

Figure 6:
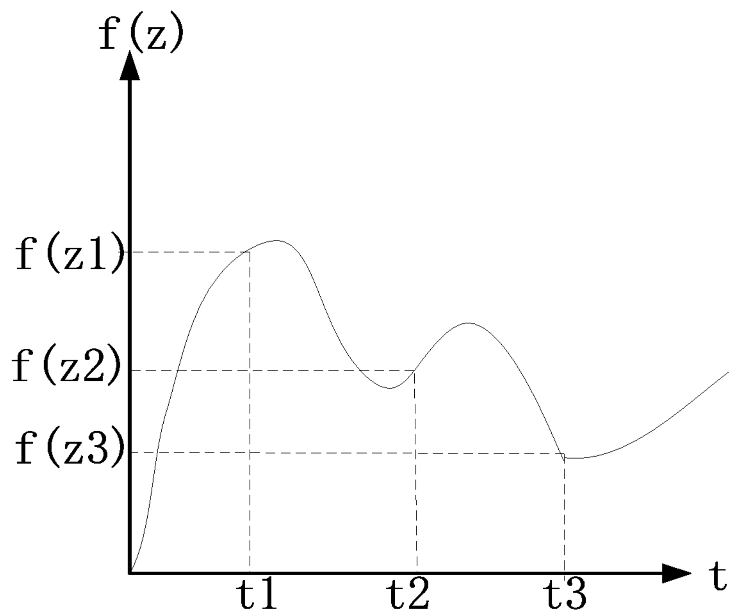
FIG. 6 is a schematic diagram illustrating a displacement pattern of a camera in a z direction in a method according to an embodiment of the present disclosure.

Referring to FIG. 6, the preset formula 2 may be used to obtain the displacement value f(z) of the camera in the z direction during the press operation based on the deformation value d1(0,0) at the origin of coordinates (0,0) on the pressure sensing module. Multiple displacement values are connected to form a displacement curve, that is, to form the displacement pattern of the camera at the origin of coordinates (0,0) on the pressure sensing module during the press operation.

Referring to FIG. 6, it is assumed that the camera has three viewfinding moments t1, t2 and t3 during the press operation. The preset formula 2 is used to calculate displacement values f(z1), f(z2) and f(z3) of the camera in the z direction at the three viewfinding moments. The displacement values f(z1), f(z2) and f(z3) of the camera in the z direction at the three viewfinding moments are compared with each other and then sorted. Ther order $f(z3)<f(z2)<f(z1)$ in FIG. 6 indicates that t3 is a moment correspondint to an optimal focal length of the camera, that is, the focal length at t3 is least affected and the viewfinding size is least affected; the next is the moment t2 and then the moment t3. Therefore, the image outputted by the camera at the viewfinding moment t3 is the final image captured by the camera during the press operation.

Figure 7:
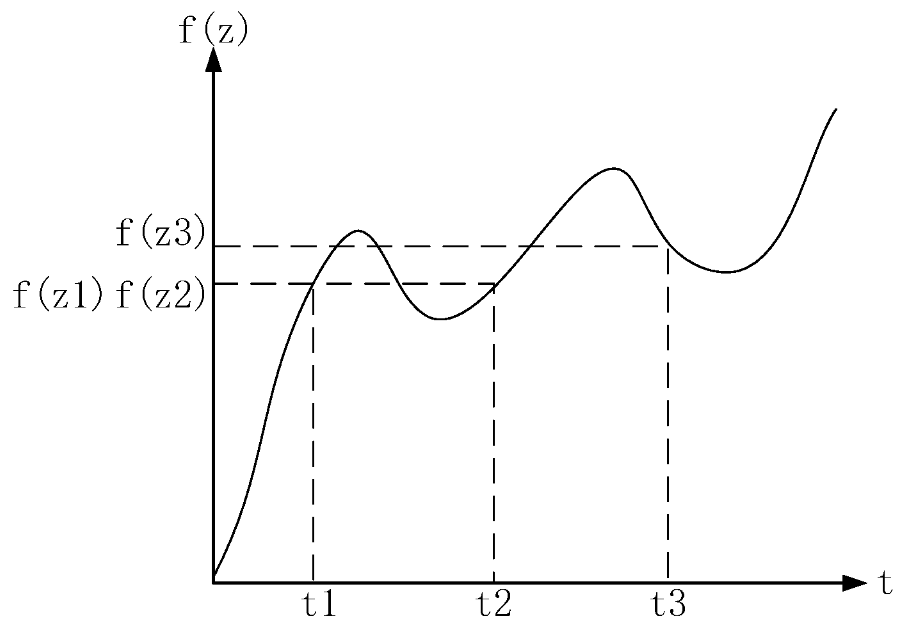
FIG. 7 is a schematic diagram illustrating displacement values in a z direction at different viewfinding moments in a method according to an embodiment of the present disclosure.

Referring to FIG. 7, it is assumed that the three displacement values f(z1), f(z2) and f(z3) calculated using the preset formula 2 are sorted in the order $f(z1)=f(z2)<f(z3)$, that is, t1 and t2 are both the viewfinding moments corresponding to the optimal focal length. In this case, the camera may output the image captured at either t1 or t2 as the final image captured during this press operation.

The displacement value of the camera in the z direction affects the focal length of the camera. The larger the displacement value is, the greater the focal length is affected and thereby the lower the image sharpness of the camera is. In the embodiment 1 of the present disclosure, a sharpest image is obtained from images taken at multiple viewfinding moments by selecting the moment corresponding to the minimal displacement value of the camera in the z direction, that is, the viewfinding moment at which the focal length is least affected.

Figure 3:
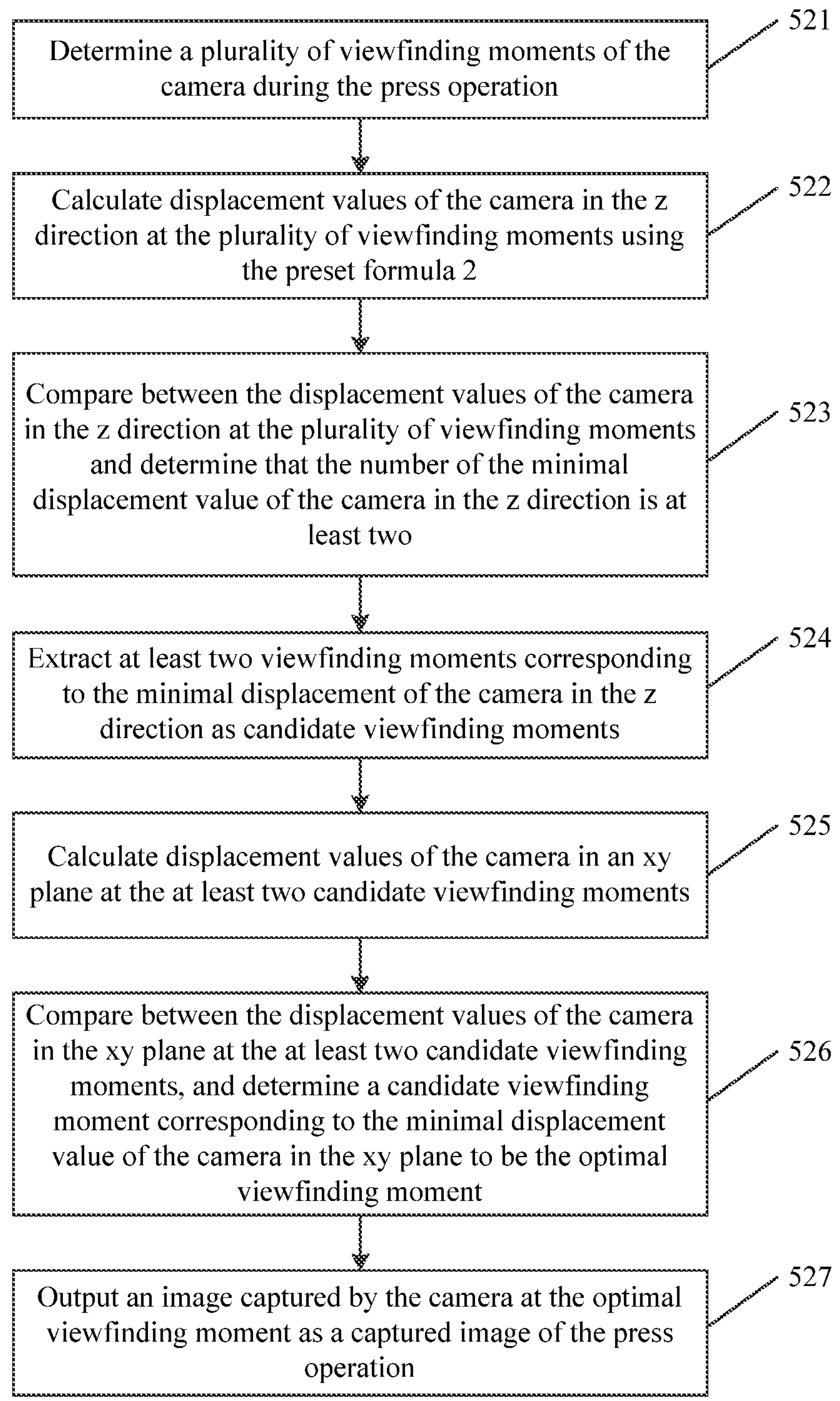
FIG. 3 is a flowchart of determining an optimal viewfinding moment of a camera by a pressure sensing module in a method according to an embodiment 2 of the present disclosure.

In the embodiment 2, the step of acquiring a time period of the press operation, the step of collecting the pressure data of the pressure sensing module, the step of calculating the deformation pattern of the pressure sensing module, and the step of calculating the displacement pattern of the camera in the z direction are all the same as those in the embodiment 1. That is, steps 511 and 512 in FIG. 2 are the same as steps 521 and 522 in FIG. 3. Details are not described here again. The embodiment 2 is different from the embodiment 1 in that, referring to FIG. 3, when the pressure sensing module determines that the number of the minimal displacement value of the camera in the z direction is at least two (i.e., step 523), the pressure sensing module performs the steps described below.

In step 524, at least two viewfinding moments corresponding to the minimal displacement of the camera in the z direction are extracted as candidate viewfinding moments.

In step 525, displacement values of the camera in an xy plane at the at least two candidate viewfinding moments are calculated.

In step 526, the displacement values of the camera in the xy plane at the at least two candidate viewfinding moments are compared with each other, and a candidate viewfinding moment corresponding to the minimal displacement value of the camera in the xy plane is determined to be the optimal viewfinding moment.

In step 527, an image captured by the camera at the optimal viewfinding moment is outputted as a captured image of the press operation.

Figure 4:
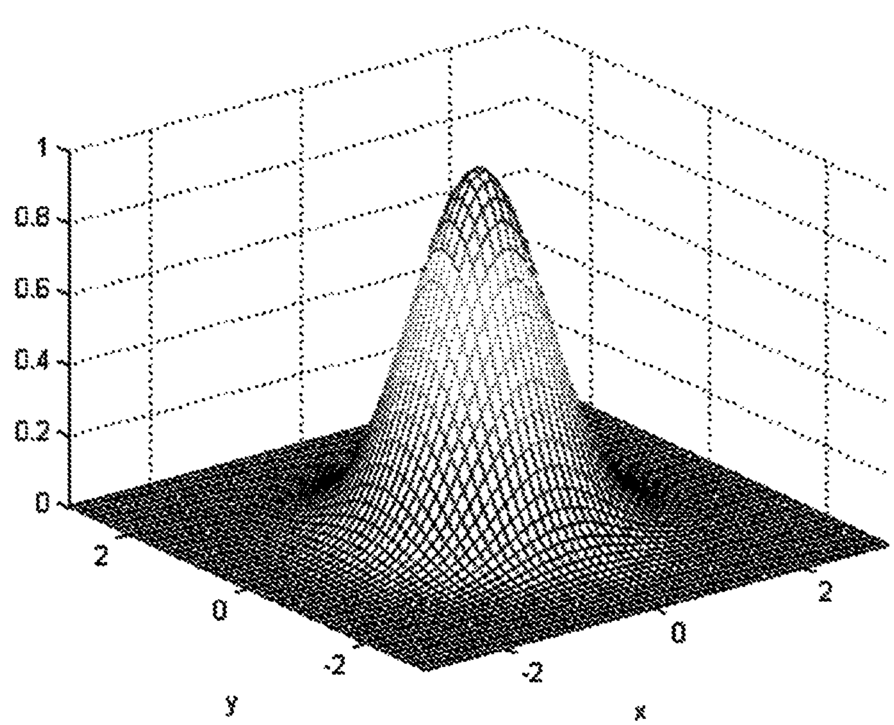
FIG. 4 is a schematic diagram illustrating pressure sensing data of a pressure sensing module in a method according to an embodiment of the present disclosure.
Figure 5:
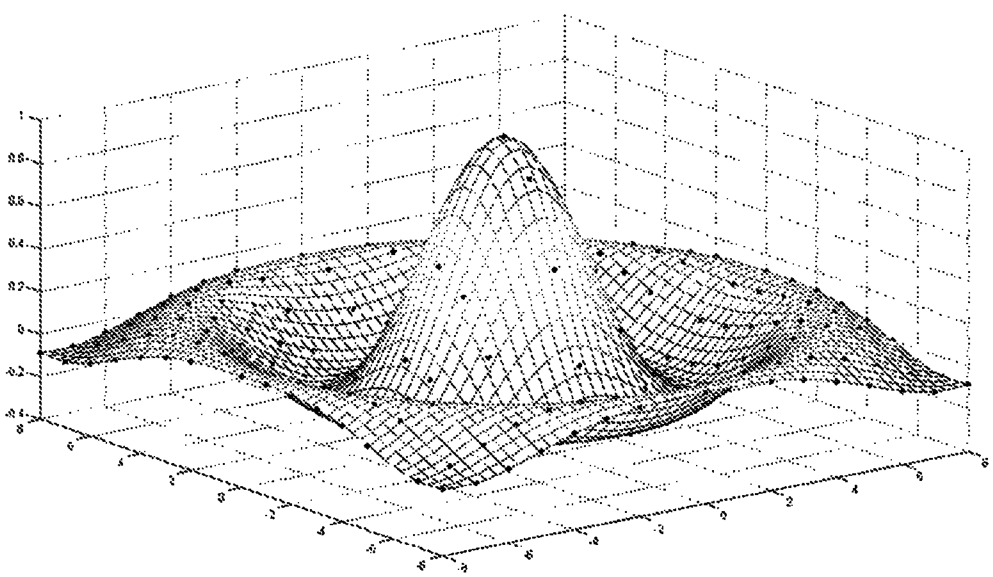
FIG. 5 is a schematic diagram illustrating a deformation pattern of a pressure sensing module in a method according to an embodiment of the present disclosure.

Referring to FIG. 4, the step 525 of calculating the displacement values of the camera in the xy plane at the at least two candidate viewfinding moments includes the following steps:

a force Fx applied on the camera in an x direction during the press operation is determined;

displacement values f(x) of the camera in the x direction at the at least two candidate viewfinding moments are determined using a preset formula 3 based on the deformation value d1(x,y) at the each location point on the pressure sensing module, where the preset formula 3 is:

$$f(x)=d1(x,y)\times\int Fx\times t^2/mdt,$$

where m denotes the quality of the camera and t denotes a duration from the starting time of the press operation to each of the at least two candidate viewfinding moments;

a force Fy applied on the camera in a y direction during the press operation is determined;

displacement values f(y) of the camera in the y direction at the at least two candidate viewfinding moments are determined using a preset formula 4 based on the deformation value d1(x,y) at the each location point on the pressure sensing module, and the deformation pattern of the camera in the y direction during the press operation is calculated, where the preset formula 4 is:

$$f(y)=d1(x,y)\times\int Fy\times t^2/mdt,$$

where m denotes the quality of the camera and t denotes the duration from the starting time of the press operation to the each of the at least two candidate viewfinding moments; and the displacement values of the camera in the xy plane at the at least two candidate viewfinding moments are calculated based on the displacement values f(x) of the camera in the x direction and the displacement values f(y) of the camera in the y direction at the at least two candidate viewfinding moments.

The step of determining the force Fx applied on the camera in the x direction, the force Fy applied on the camera in the y direction and the force Fz applied on the camera in the z direction during the press operation includes the following steps:

a coordinate location point A of a projection of the camera in a plane, where the pressure sensing module is located, is determined;

a deformation value d1(m,n) of the pressure sensing module at the coordinate location point A is determined using the preset formula 1; and the force Fx applied on the camera in the x direction, the force Fy applied on the camera in the y direction and the force Fz applied on the camera in the z direction are determined based on the deformation value d1(m,n) of the pressure sensing module at the coordinate location point A.

Figure 8:
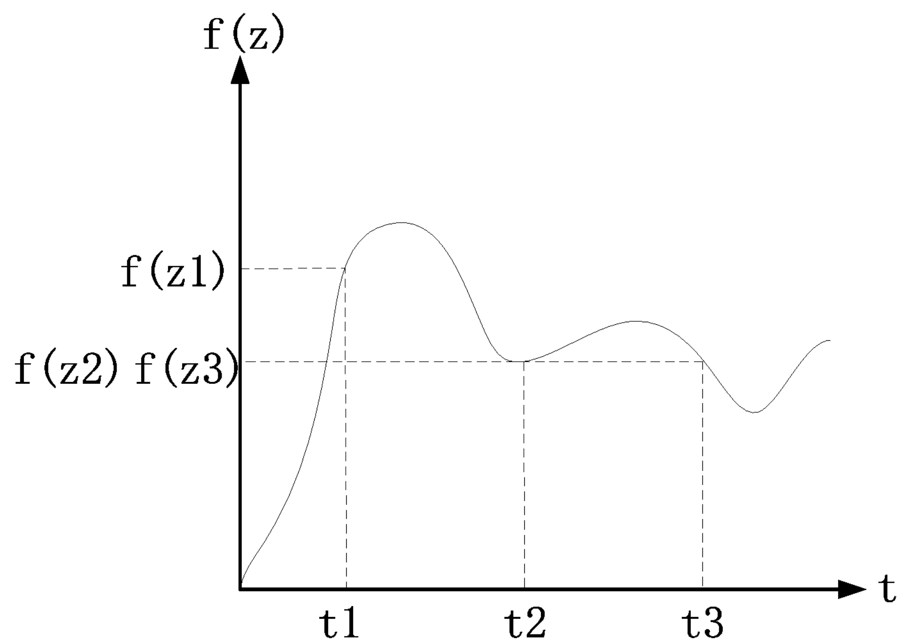
FIG. 8 is a schematic diagram illustrating displacement values in a z direction at different viewfinding moments in a method according to an embodiment of the present disclosure.
Figure 9:
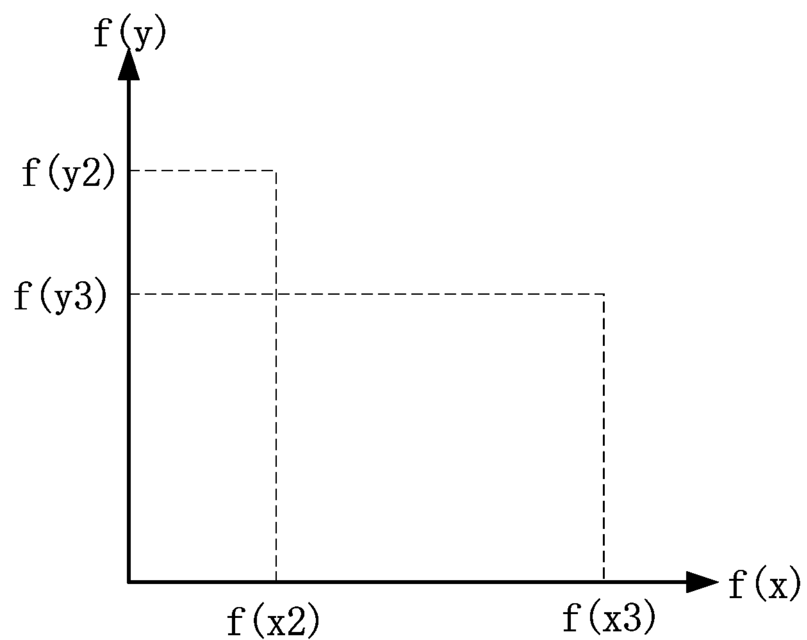
FIG. 9 is a schematic diagram illustrating displacement values in an xy plane at two candidate viewfinding moments in a method according to an embodiment of the present disclosure.

In one or more embodiments, still with the pressure sensing module at the point (0,0) as an example, according to the calculated displacement values f(z1), f(z2) and f(z3) of the camera at the viewfinding moments t1, t2, and t3, referring to FIG. 8, the pressure sensing module determines that f(z1)>f(z2)=f(z3). That is, there are two viewfinding moments corresponding to the minimal displacement value of the camera. Then the pressure sensing module no longer outputs the image captured at the viewfinding moment corresponding to the minimal displacement value in the z direction. Instead, the displacement values f(x2) and f(x3) in the x direction and the displacement values f(y2) and f(y3) in the y direction at the two candidate viewfinding moments t2 and t3 are calculated using the preset formula 3 and the preset formula 4 respectively, and the distance of the displacement values at the two coordinate points (f(x2),f(y2)) and (f(x3),f(y3)) with respect to the origin of the coordinates (i.e., the initial moment at which the camera has not begun to displace in the xy plane) is determined in conjunction with the two candidate viewfinding moments t2 and t3 according to the obtained f(x2), f(x3), f(y2) and f(y3). Referring to FIG. 9, the sum of the displacement values in the xy plane at the viewfinding moment t2 is less than the sum of the displacement values in the xy plane at the viewfinding moment t3, so the viewfinding moment t2 is considered to be the moment at which the center of the image displaces over the shortest distance. Thus, the image captured at the viewfinding moment t2 corresponding to the minimal displacement value of the camera in the xy plane as the final image captured during this press operation.

Here, it is further assumed that more viewfinding moments, for example, 100 viewfinding moments, are selected for the camera. If there is only one viewfinding moment corresponding to a minimal displacement value of the camera in the z direction among the 100 viewfinding moments, then the image captured at the viewfinding moment corresponding to the minimal displacement value of the camera in the z direction is outputted according to step 514. If there are at least two viewfinding moments corresponding to the minimal displacement value of the camera in the z direction among the 100 viewfinding moments, then the image captured at the viewfinding moment corresponding to the minimal displacement value of the camera in the xy plane is outputted according to steps 524 to 527.

The displacement value of the camera in the xy plane affects the drift value of the center position of the camera. The smaller the displacement value of the camera in the xy plane is, the smaller the drift value of the center position of the camera and the higher the sharpness of the camera are. After at least two candidate viewfinding moments corresponding to the minimal displacement value of the camera in the z direction are determined, that is, after the range of viewfinding moments at which the camera selects the sharpest image is narrowed down, the displacement values in the xy plane at the at least two candidate viewfinding moments are compared with each other, so that the image captured at the viewfinding moment corresponding to the minimal displacement value of the camera in the xy plane is selected as the final image outputted by the camera. The embodiment 2 further compares and selects viewfinding moments corresponding to the minimal displacement values of the camera are the same in the embodiment 1. The final image selected and outputted by the camera in embodiment 1 is sharper than the image which is captured at multiple viewfinding moments corresponding to the same minimal displacement value of the camera and is outputted directly in the embodiment 1.

The method for controlling photographing of a camera provided by embodiments of the present disclosure uses the pressure sensing module to collect the pressure data of the pressure sensing module, calculates the deformation pattern of the pressure sensing module, calculates the displacement information of the camera, and then selects the final image outputted by the camera according to the displacement values of the camera at the plurality of viewfinding moments during the press operation, thereby improving the sharpness of photographs produced by the camera under pressure.

Figure 10:
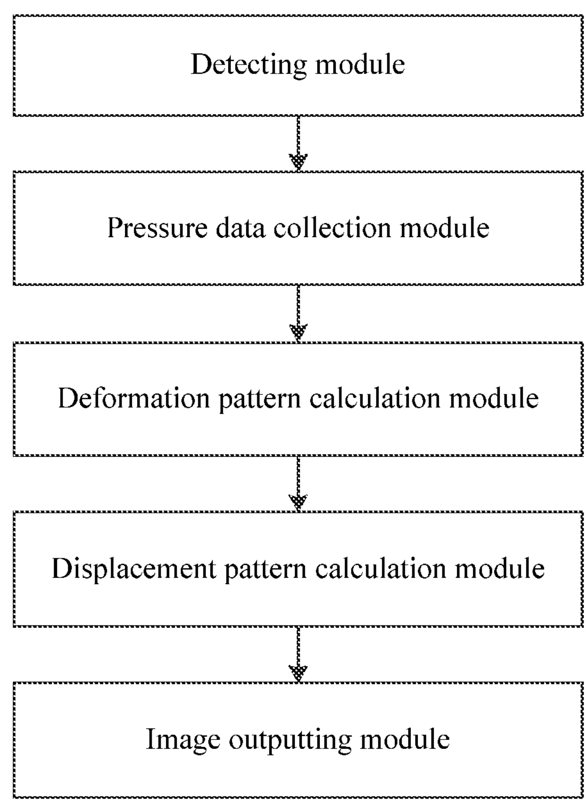
FIG. 10 is a structure diagram of an apparatus for controlling photographing of a camera according to the embodiment 1 of the present disclosure.

In another aspect of the present application, referring to FIG. 10, embodiments of the present disclosure further provide an apparatus for controlling photographing of a camera. The apparatus is applied to an electronic device whose photographic shutter area is provided with a pressure sensing module. The apparatus includes:

a detecting module, which is configured to detect a press operation for a photographic shutter;

a pressure data collection module, which is configured to collect pressure sensing data of the pressure sensing module when the press operation is detected;

a deformation pattern calculation module, which is configured to calculate a deformation pattern of the pressure sensing module during the press operation based on the pressure sensing data;

a displacement pattern calculation module, which is configured to calculate a displacement pattern of the camera during the press operation based on the deformation pattern; and an image outputting module, which is configured to determine, according to the displacement pattern, a viewfinding moment at which the camera is capable of capturing an optimal image during the press operation and output an image captured by the camera at the viewfinding moment.

The apparatus for controlling photographing of a camera provided by embodiments of the present disclosure uses the above method for controlling photographing of a camera to determine the viewfinding moment corresponding to a minimal transient displacement value of the camera, that is, the apparatus is capable of determining the highest sharpness of the final photograph outputted by the camera.

Figure 11:
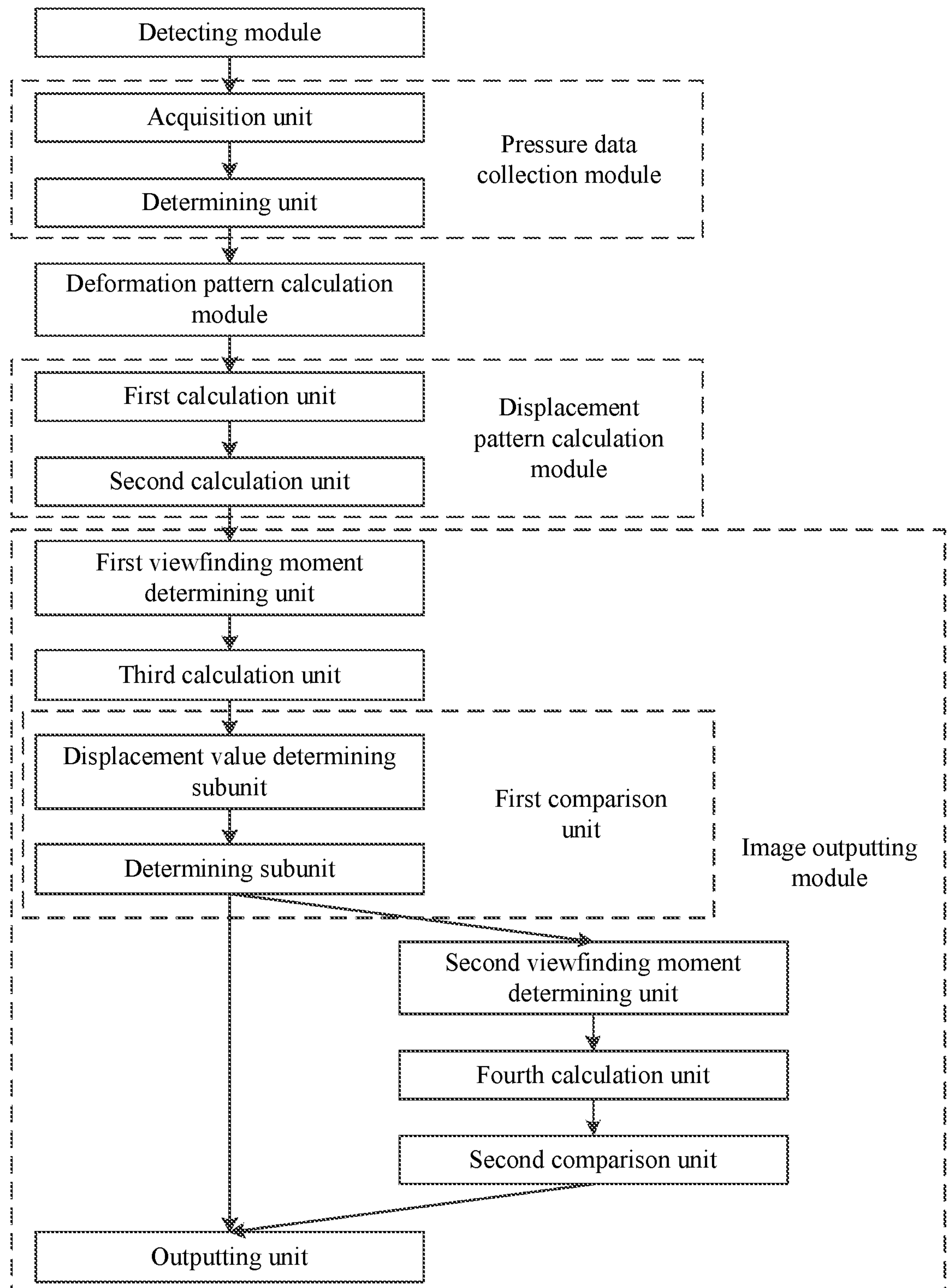
FIG. 11 is a structure diagram of an apparatus for controlling photographing of a camera according to the embodiment 2 of the present disclosure.

Referring to FIG. 11, the pressure data collection module includes:

an acquisition unit, which is configured to acquire the pressure sensing data transmitted by the pressure sensing module; and a determining unit, which is configured to determine a pressure value p(x,y) at each location point on the pressure sensing module by taking a position on the pressure sensing module and corresponding to the photographic shutter as an origin of coordinates, where (x,y) denote distance and position information of each location point on the pressure sensing module relative to the origin of coordinates.

Referring to FIG. 11, the deformation pattern calculation module is configured to:

determine a deformation value d1(x,y) at the each location point on the pressure sensing module using a preset formula 1 based on the pressure value p(x,y) at the each location point on the pressure sensing module, and determine the deformation pattern of the pressure sensing module during the press operation, where the preset formula 1 is:

$$d1(x,y)=p(x,y)\times\lambda(x,y),$$

where λ(x,y) denotes a deformation coefficient of the each location point on the pressure sensing module.

Referring to FIG. 11, the displacement pattern calculation module includes:

a first calculation unit, which is configured to determine a force Fz applied on the camera in a z direction during the press operation, where the z direction is a direction parallel to a direction of the press operation; and a second calculation unit, which is configured to determine a displacement value f(z) of the camera in the z direction at each moment during the press operation using a preset formula based on the deformation value d1(x,y) at the each location point on the pressure sensing module, and to determine the deformation pattern of the camera in the z direction during the press operation, where the preset formula 2 is:

$$f(z)=d1(x,y)\times\int Fz\times t^2/mdt,$$

where m denotes a quality of the camera and t denotes a duration from a starting time of the press operation to the each moment during the press operation.

Referring to FIG. 11, the image outputting module includes:

a first viewfinding moment determining unit, which is configured to determine a plurality of viewfinding moments of the camera during the press operation;

a third calculation unit, which is configured to calculate displacement values of the camera in the z direction at the plurality of viewfinding moments using the preset formula 2;

a first comparison unit, which is configured to compare between the displacement values of the camera in the z direction at the plurality of viewfinding moments and determine a viewfinding moment corresponding to a minimal displacement value of the camera in the z direction to be an optimal viewfinding moment; and an outputting unit, which is configured to output an image captured by the camera at the optimal viewfinding moment as a captured image of the press operation.

Referring to FIG. 11, the first comparison unit includes:

a displacement value determining subunit, which is configured to compare between the displacement values in the z direction at the plurality of viewfinding moments to determine a minimal displacement value; and a determining subunit, which is configured to determine whether a number of the determined minimal displacement value is one; when the number of the determined minimal displacement values is one, determine the viewfinding moment corresponding to the minimal displacement of the camera in the z direction to be the optimal viewfinding moment; where when the number of the determined minimal displacement value is at least two, the image outputting module further includes:

a second viewfinding moment determining unit, which is configured to extract at least two viewfinding moments corresponding to the minimal displacement of the camera in the z direction as candidate viewfinding moments;

a fourth calculation unit, which is configured to calculate displacement values of the camera on an xy plane at the at least two candidate viewfinding moments, where the xy plane is a plane perpendicular to the direction of the press operation; and a second comparison unit, which is configured to compare between the displacement values of the camera in the xy plane at the at least two candidate viewfinding moments and determine one candidate viewfinding moment corresponding to a minimal displacement of the camera in the xy plane to be the optimal viewfinding moment.

Referring to FIG. 11, the fourth calculation unit is configured to:

determine a force Fx applied on the camera in an x direction during the press operation;

determine displacement values f(x) of the camera in the x direction at the at least two candidate viewfinding moments using a preset formula 3 based on the deformation value d1(x,y) at the each location point on the pressure sensing module, where the preset formula 3 is:

$$f(x)=d1(x,y)\times\int Fx\times t^2/mdt,$$

where m denotes the quality of the camera and t denotes a duration from the starting time of the press operation to each of the at least two candidate viewfinding moments;

determine a force Fy applied on the camera in a y direction during the press operation;

determine displacement values f(y) of the camera in the y direction at the at least two candidate viewfinding moments using a preset formula 4 based on the deformation value d1(x,y) at the each location point on the pressure sensing module, and calculate the deformation pattern of the camera in the y direction during the press operation, where the preset formula 4 is:

$$f(y)=d1(x,y)\times\int Fy\times t^2/mdt,$$

where m denotes the quality of the camera and t denotes the duration from the starting time of the press operation to the each of the at least two candidate viewfinding moments; and calculate the displacement values of the camera in the xy plane at the at least two candidate viewfinding moments based on the displacement values f(x) of the camera in the x direction and the displacement values f(y) of the camera in the y direction at the at least two candidate viewfinding moments.

The step of determining the force Fx applied on the camera in the x direction, the force Fy applied on the camera in the y direction and the force Fz applied on the camera in the z direction during the press operation includes the following steps:

a coordinate location point A of a projection of the camera in a plane, where the pressure sensing module is located, is determined;

a deformation value d1(m,n) of the pressure sensing module at the coordinate location point A using the preset formula 1 is determined; and determining the force Fx applied on the camera in the x direction, the force Fy applied on the camera in the y direction and the force Fz applied on the camera in the z direction based on the deformation value d1(m,n) of the pressure sensing module at the coordinate location point A.

The force Fx applied on the camera in the x direction and the force Fy applied on the camera in the y direction are both calculated by the fourth calculation unit.

The apparatus for controlling photographing of a camera provided by embodiments of the present disclosure uses the above method for controlling photographing of a camera to determine the viewfinding moment corresponding to the minimal displacement value of the camera in the z direction and in the xy plane, and uses the outputting unit to output the image captured at this viewfinding moment, thereby ensuring the highest sharpness of the photograph taken by the camera.

Additionally, embodiments of the present disclosure further provide an electronic device including a camera, a pressure sensing module and a processor. The pressure sensing module is disposed in a photographic shutter area of the camera. The pressure sensing module is configured to detecting a press operation for a photographic shutter; and collect pressure sensing data of the pressure sensing module when the press operation is detected. The processor is configured to calculate a deformation pattern of the pressure sensing module during the press operation based on the pressure sensing data; calculate a displacement pattern of the camera during the press operation based on the deformation pattern; and determine, according to the displacement pattern, a viewfinding moment at which the camera is capable of capturing an optimal image during the press operation. The camera is configured to output an image captured by the camera at the viewfinding moment.

Additionally, embodiments of the present disclosure further provide a computer-readable storage medium configured to store computer-executable instructions for implementing the above-mentioned method for controlling photographing of a camera when the computer-executable instructions are executed.

It will be understood by those of ordinary skill in the art that all or part of the steps in the methods described above may be implemented by related hardware (e.g., a processor) instructed by one or more programs, and these programs may be stored in a computer-readable storage medium such as a ROM, a magnetic disk, an optical disk. Alternatively, all or part of the steps in the embodiments described above may also be implemented using one or more integrated circuits. Accordingly, the modules/units in the embodiments described above may be implemented by hardware. For example, the functions of these modules/units may be implemented by one or more integrated circuits. Alternatively, these modules/units may be implemented by software function modules. For example, the functions of these modules/units may be implemented by using a processor to execute programs/instructions stored in a storage medium. The present application is not limited to any specific combination of hardware and software.

The above are preferred embodiments of the present application. It is to be noted that for those skilled in the art, a number of improvements and modifications can be made without departing from the principle of the present application, and these improvements and modifications are within the scope of the present application.

INDUSTRIAL APPLICABILITY

The method and apparatus for controlling photographing of a camera provided by embodiments of the present disclosure ensures high sharpness of a photograph taken by the camera.

What is claimed is:

1. A method for controlling photographing of a camera, applied to an electronic device, wherein a pressure sensor is arranged in a photographic shutter area of the electronic device, the method comprising:

detecting a press operation for a photographic shutter through the pressure sensor;

collecting pressure sensing data of the pressure sensor in response to detecting the press operation;

by at least one processor, calculating a deformation pattern of the pressure sensor during the press operation based on the pressure sensing data;

by the at least one processor, calculating a displacement pattern of the camera during the press operation based on the deformation pattern; and by the at least one processor, determining, according to the displacement pattern, a viewfinding moment at which the camera is capable of capturing an optimal image during the press operation, and outputting an image captured by the camera at the viewfinding moment.

2. The method for controlling photographing of a camera according to claim 1, wherein collecting the pressure sensing data of the pressure sensor comprises:

acquiring the pressure sensing data transmitted by the pressure sensor; and determining a pressure value p(x,y) at each location point on the pressure sensor by taking a position on the pressure sensor and corresponding to the photographic shutter as an origin of coordinates, wherein (x,y) denotes distance and position information of the each location point on the pressure sensor relative to the origin of coordinates.

3. The method for controlling photographing of a camera according to claim 2, wherein calculating the deformation pattern of the pressure sensor during the press operation based on the pressure sensing data comprises:

determining a deformation value d1(x,y) at the each location point on the pressure sensor using a preset formula 1 based on the pressure value p(x,y) at the each location point on the pressure sensor, and determining the deformation pattern of the pressure sensor during the press operation, wherein the preset formula 1 is:

$$d1(x,y)=p(x,y)\times 2(x,y),$$

where λ(x, y) denotes a deformation coefficient at the each location point on the pressure sensor.

4. The method for controlling photographing of a camera according to claim 3, wherein calculating the displacement pattern of the camera during the press operation based on the deformation pattern comprises:

determining a force Fz applied on the camera in a z direction through the pressure sensor during the press operation, wherein the z direction is a direction parallel to a direction of the press operation; and determining a displacement value f(z) of the camera in the z direction at each moment during the press operation using a preset formula 2 based on the deformation value d1(x,y) at the each location point on the pressure sensor, and determining the deformation pattern of the camera in the z direction during the press operation, wherein the preset formula 2 is:

$$f(z)=d1(x,y)\times\int Fz\times t^2/mdt$$

where m denotes a quality of the camera and t denotes a duration from a starting time of the press operation to the each moment during the press operation.

5. The method for controlling photographing of a camera according to claim 4, wherein determining, according to the displacement pattern, the viewfinding moment at which the camera is capable of capturing an optimal image during the press operation, and outputting the image captured by the camera at the viewfinding moment comprises:

determining a plurality of viewfinding moments of the camera during the press operation;

calculating a plurality of displacement values of the camera in the z direction at the plurality of viewfinding moments using the preset formula 2;

comparing between the displacement values of the camera in the z direction at the plurality of viewfinding moments and determining a viewfinding moment corresponding to a minimal displacement value of the camera in the z direction to be an optimal viewfinding moment; and outputting an image captured by the camera at the optimal viewfinding moment as a captured image of the press operation.

6. The method for controlling photographing of a camera according to claim 5, wherein comparing between the displacement values of the camera in the z direction at the plurality of viewfinding moments comprises:

comparing between the displacement values in the z direction at the plurality of viewfinding moments to determine a minimal displacement value; and determining whether a number of the determined minimal displacement value is one; in response to determining that the number of the determined minimal displacement value is one, determining the viewfinding moment corresponding to the minimal displacement value of the camera in the z direction to be the optimal viewfinding moment;

wherein in response to determining that the number of the determined minimal displacement value is at least two, the method further comprises:

extracting at least two viewfinding moments corresponding to the minimal displacement value of the camera in the z direction as candidate viewfinding moments;

calculating a plurality of displacement values of the camera in an xy plane at the at least two candidate viewfinding moments, wherein the xy plane is a plane perpendicular to the direction of the press operation; and comparing between the displacement values of the camera in the xy plane at the at least two candidate viewfinding moments and determining one candidate viewfinding moment of the at least two candidate viewfinding moments corresponding to a minimal displacement value of the camera in the xy plane to be the optimal viewfinding moment.

7. The method for controlling photographing of a camera according to claim 6, wherein calculating the displacement values of the camera in the xy plane at the at least two candidate viewfinding moments comprises:

determining, through the pressure sensor, a force Fx applied on the camera in an x direction during the press operation;

determining a plurality of displacement values f(x) of the camera in the x direction at the at least two candidate viewfinding moments using a preset formula 3 based on the deformation value d1(x,y) at the each location point on the pressure sensor, wherein the preset formula 3 is:

$$f(x)=d1(x,y)\times\int Fx\times t^2/mdt,$$

where m denotes the quality of the camera and t denotes a duration from the starting time of the press operation to each of the at least two candidate viewfinding moments;

determining, through the pressure sensor, a force Fy applied on the camera in a y direction during the press operation;

determining a plurality of displacement values f(y) of the camera in the y direction at the at least two candidate viewfinding moments using a preset formula 4 based on the deformation value d1(x,y) at the each location point on the pressure sensor, and calculating the deformation pattern of the camera in the y direction during the press operation, wherein the preset formula 4 is:

$$f(y)=d1(x,y)\times\int Fy\times t^2/mdt$$

where m denotes the quality of the camera and t denotes the duration from the starting time of the press operation to the each of the at least two candidate viewfinding moments; and calculating the displacement values of the camera in the xy plane at the at least two candidate viewfinding moments based on the displacement values f(x) of the camera in the x direction and the displacement values f(y) of the camera in the y direction at the at least two candidate viewfinding moments.

8. The method for controlling photographing of a camera according to claim 7, wherein determining the force Fx applied on the camera in the x direction, the force Fy applied on the camera in the y direction and the force Fz applied on the camera in the z direction during the press operation comprises:

determining a coordinate location point A of a projection of the camera in a plane where the pressure sensor is located;

determining a deformation value d1(m,n) of the pressure sensor at the coordinate location point A using the preset formula 1; and determining the force Fx applied on the camera in the x direction, the force Fy applied on the camera in the y direction and the force Fz applied on the camera in the z direction based on the deformation value d1(m,n) of the pressure sensor at the coordinate location point A.

9. An apparatus for controlling photographing of a camera, applied to an electronic device, wherein a pressure sensor is arranged in a photographic shutter area, the apparatus comprises:

a processor; and a memory for storing instructions executable by the processor, wherein the processor is configured to:

detect a press operation for a photographic shutter through the pressure sensor;

collect pressure sensing data of the pressure sensor in response to detecting the press operation;

calculate a deformation pattern of the pressure sensor during the press operation based on the pressure sensing data;

calculate a displacement pattern of the camera during the press operation based on the deformation pattern; and determine, according to the displacement pattern, a viewfinding moment at which the camera is capable of capturing an optimal image during the press operation and output an image captured by the camera at the viewfinding moment.

10. The apparatus for controlling photographing of a camera according to claim 9, wherein the processor is specifically configured to:

acquire the pressure sensing data transmitted by the pressure sensor; and determine a pressure value p(x,y) at each location point on the pressure sensor by taking a position on the pressure sensor and corresponding to the photographic shutter as an origin of coordinates, wherein (x,y) denotes distance and position information of the each location point on the pressure sensor relative to the origin of coordinates.

11. The apparatus for controlling photographing of a camera according to claim 10, wherein the processor is configured to:

determine a deformation value d1(x,y) at the each location point on the pressure sensor using a preset formula 1 based on the pressure value p(x,y) at the each location point on the pressure sensor, and determine the deformation pattern of the pressure sensor during the press operation, wherein the preset formula 1 is:

$$d1(x,y)=p(x,y)\times\lambda(x,y),$$

where λ(x, y) denotes a deformation coefficient of the each location point on the pressure sensor.

12. The apparatus for controlling photographing of a camera according to claim 11, wherein the processor is specifically configured to:

determine, through the pressure sensor, a force Fz applied on the camera in a z direction during the press operation, wherein the z direction is a direction parallel to a direction of the press operation; and determine a displacement value f(z) of the camera in the z direction at each moment during the press operation using a preset formula based on the deformation value d1(x,y) at the each location point on the pressure sensor, and to determine the deformation pattern of the camera in the z direction during the press operation, wherein the preset formula 2 is:

$$f(z)=d1(x,y)\times\int Fz\times t^2/mdt,$$

where m denotes a quality of the camera and t denotes a duration from a starting time of the press operation to the each moment during the press operation.

13. The apparatus for controlling photographing of a camera according to claim 12, wherein the processor is specifically configured to:

determine a plurality of viewfinding moments of the camera during the press operation;

calculate a plurality of displacement values of the camera in the z direction at the plurality of viewfinding moments using the preset formula 2;

compare between the displacement values of the camera in the z direction at the plurality of viewfinding moments and determine a viewfinding moment corresponding to a minimal displacement value of the camera in the z direction to be an optimal viewfinding moment; and output an image captured by the camera at the optimal viewfinding moment as a captured image of the press operation.

14. The apparatus for controlling photographing of a camera according to claim 13, wherein the processor is specifically configured to:

compare between the displacement values in the z direction at the plurality of viewfinding moments to determine a minimal displacement value; and determine whether a number of the determined minimal displacement value is one; in response to determining that the number of the determined minimal displacement value is one, determine the viewfinding moment corresponding to the minimal displacement value of the camera in the z direction to be the optimal viewfinding moment;

wherein in response to determining that the number of the determined minimal displacement value is at least two, the processor is further configured to:

extract at least two viewfinding moments corresponding to the minimal displacement value of the camera in the z direction as candidate viewfinding moments;

calculate a plurality of displacement values of the camera in an xy plane at the at least two candidate viewfinding moments, wherein the xy plane is a plane perpendicular to the direction of the press operation; and compare between the displacement values of the camera in the xy plane at the at least two candidate viewfinding moments and determine one candidate viewfinding moment of the at least two candidate viewfinding moments corresponding to a minimal displacement value of the camera in the xy plane to be the optimal viewfinding moment.

15. The apparatus for controlling photographing of a camera according to claim 14, wherein the processor is configured to:

determine, through the pressure sensor, a force Fx applied on the camera in an x direction during the press operation;

determine a plurality of displacement values f(x) of the camera in the x direction at the at least two candidate viewfinding moments using a preset formula 3 based on the deformation value d1(x,y) at the each location point on the pressure sensor, wherein the preset formula 3 is:

$$f(x)=d1(x,y)\times\int Fx\times t^2/mdt,$$

where m denotes the quality of the camera and t denotes a duration from the starting time of the press operation to each of the at least two candidate viewfinding moments;

determine, through the pressure sensor, a force Fy applied on the camera in a y direction during the press operation;

determine a plurality of displacement values f(y) of the camera in the y direction at the at least two candidate viewfinding moments using a preset formula 4 based on the deformation value d1(x,y) at the each location point on the pressure sensor, and to calculate the deformation pattern of the camera in the y direction during the press operation, wherein the preset formula 4 is:

$$f(y)=d1(x,y)\times\int Fy\times t^2/mdt,$$

where m denotes the quality of the camera and t denotes the duration from the starting time of the press operation to the each of the at least two candidate viewfinding moments; and calculate the displacement values of the camera in the xy plane at the at least two candidate viewfinding moments based on the displacement values f(x) of the camera in the x direction and the displacement values f(y) of the camera in the y direction at the at least two candidate viewfinding moments.

16. A non-transitory computer-readable storage medium, which stores computer-executable instructions for implementing a method for controlling photographing of a camera, applied to an electronic device, wherein a pressure sensor is arranged in a photographic shutter area of the electronic device, the method comprising:

detecting a press operation for a photographic shutter through the pressure sensor;

collecting pressure sensing data of the pressure sensor in response to detecting the press operation;

calculating a deformation pattern of the pressure sensor during the press operation based on the pressure sensing data;

calculating a displacement pattern of the camera during the press operation based on the deformation pattern; and determining, according to the displacement pattern, a viewfinding moment at which the camera is capable of capturing an optimal image during the press operation, and outputting an image captured by the camera at the viewfinding moment.

17. The computer-readable storage medium according to claim 16, wherein collecting the pressure sensing data of the pressure sensor comprises:

acquiring the pressure sensing data transmitted by the pressure sensor; and determining a pressure value p(x,y) at each location point on the pressure sensor by taking a position on the pressure sensor and corresponding to the photographic shutter as an origin of coordinates, wherein (x,y) denotes distance and position information of the each location point on the pressure sensor relative to the origin of coordinates.

18. The computer-readable storage medium according to claim 17, wherein calculating the deformation pattern of the pressure sensor during the press operation based on the pressure sensing data comprises:

determining a deformation value d1(x,y) at the each location point on the pressure sensor using a preset formula 1 based on the pressure value p(x,y) at the each location point on the pressure sensor, and determining the deformation pattern of the pressure sensor during the press operation, wherein the preset formula 1 is:

$$d1(x,y)=p(x,y)\times\lambda(x,y),$$

where λ(x, y) denotes a deformation coefficient at the each location point on the pressure sensor.

19. The computer-readable storage medium according to claim 18, wherein calculating the displacement pattern of the camera during the press operation based on the deformation pattern comprises:

determining, through the pressure sensor, a force Fz applied on the camera in a z direction during the press operation, wherein the z direction is a direction parallel to a direction of the press operation; and determining a displacement value f(z) of the camera in the z direction at each moment during the press operation using a preset formula 2 based on the deformation value d1(x,y) at the each location point on the pressure sensor, and determining the deformation pattern of the camera in the z direction during the press operation, wherein the preset formula 2 is:

$$f(z)=d1(x,y)\times\int Fz\times t^2/mdt$$

where m denotes a quality of the camera and t denotes a duration from a starting time of the press operation to the each moment during the press operation.

20. The computer-readable storage medium according to claim 19, wherein determining, according to the displacement pattern, the viewfinding moment at which the camera is capable of capturing an optimal image during the press operation, and outputting the image captured by the camera at the viewfinding moment comprises:

determining a plurality of viewfinding moments of the camera during the press operation;

calculating a plurality of displacement values of the camera in the z direction at the plurality of viewfinding moments using the preset formula 2;

comparing between the displacement values of the camera in the z direction at the plurality of viewfinding moments and determining a viewfinding moment corresponding to a minimal displacement value of the camera in the z direction to be an optimal viewfinding moment; and outputting an image captured by the camera at the optimal viewfinding moment as a captured image of the press operation.

* * * * *